(12) United States Patent
Wang et al.

(10) Patent No.: US 10,351,967 B2
(45) Date of Patent: Jul. 16, 2019

(54) SENSITIVE FILM FOR NEUTRON DETECTION AND METHOD FOR FORMING THE SAME

(71) Applicant: Nuctech Company Limited, Beijing (CN)

(72) Inventors: Yongqiang Wang, Beijing (CN); Qingjun Zhang, Beijing (CN); Yuanjing Li, Beijing (CN); Ziran Zhao, Beijing (CN); Jianping Chang, Beijing (CN); Yanchun Wang, Beijing (CN); Lifeng Sun, Beijing (CN); Nan Bai, Beijing (CN); Xingliang Zhai, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/843,666

(22) Filed: Dec. 15, 2017

(65) Prior Publication Data

US 2018/0179658 A1   Jun. 28, 2018

(30) Foreign Application Priority Data

Dec. 26, 2016  (CN) .......................... 2016 1 1218520

(51) Int. Cl.
*C08K 3/14* (2006.01)
*C08K 3/38* (2006.01)
(Continued)

(52) U.S. Cl.
CPC ............ *C25D 13/02* (2013.01); *C09D 5/4488* (2013.01); *C09D 5/4492* (2013.01); *C09D 7/61* (2018.01);
(Continued)

(58) Field of Classification Search
None
See application file for complete search history.

(56) References Cited

U.S. PATENT DOCUMENTS

| 4,246,087 A * | 1/1981 | Tsou ................... C08G 59/1472 428/418 |
| 4,724,063 A * | 2/1988 | McIntyre ............ C25B 11/0489 427/302 |

(Continued)

FOREIGN PATENT DOCUMENTS

| CN | 101314842 A | 12/2008 |
| CN | 102749641 A | 10/2012 |

(Continued)

OTHER PUBLICATIONS

European Extended Search Report dated May 3, 2018 received in European Patent Application No. 17 20 7745.5.

*Primary Examiner* — Edwin C Gunberg
(74) *Attorney, Agent, or Firm* — Scully, Scott, Murphy & Presser, P.C.

(57) ABSTRACT

The present invention provides a method for forming a sensitive film for neutron detection, wherein the sensitive film is formed by electrophoresis coating, the liquid used for electrophoresis coating includes neutron sensitive material, electrophoresis paint and deionized water, and the neutron sensitive material is $^{10}$B single substance, $^{10}$B compound or mixture containing $^{10}$B. The sensitive film for neutron detection has the high detection efficiency because of the high content of $^{10}$B. The sensitive film for neutron detection has the uniform and stable film thickness, and excellent consistency. The production efficiency and the cost of the sensitive film are improved.

15 Claims, 2 Drawing Sheets

(51) Int. Cl.
    *C09D 5/44*         (2006.01)
    *C09D 7/61*         (2018.01)
    *G01T 3/00*         (2006.01)
    *C25D 13/02*       (2006.01)
    *C25D 13/12*       (2006.01)
    *C25D 13/20*       (2006.01)
    *C25D 13/22*       (2006.01)

(52) U.S. Cl.
    CPC ............. *C25D 13/12* (2013.01); *C25D 13/20* (2013.01); *C25D 13/22* (2013.01); *G01T 3/00* (2013.01); *C08K 3/14* (2013.01); *C08K 2003/387* (2013.01)

(56) References Cited

U.S. PATENT DOCUMENTS

| | | | |
|---|---|---|---|
| 5,128,006 A * | 7/1992 | Mitchell | C25D 13/02 |
| | | | 204/490 |
| 2010/0078570 A1* | 4/2010 | Frank | G01T 3/08 |
| | | | 250/370.05 |
| 2010/0213380 A1* | 8/2010 | Kub | G01T 3/08 |
| | | | 250/370.05 |
| 2013/0062531 A1 | 3/2013 | Lustig et al. | |
| 2014/0061490 A1 | 3/2014 | Zhao et al. | |

FOREIGN PATENT DOCUMENTS

| | | |
|---|---|---|
| CN | 102967875 A | 3/2013 |
| CN | 103160799 A | 6/2013 |
| JP | 2002-161244 A | 6/2002 |
| WO | 2014120295 A2 | 8/2014 |
| WO | 2016/053413 A1 | 4/2016 |

\* cited by examiner

SENSITIVE FILM FOR NEUTRON DETECTION AND METHOD FOR FORMING THE SAME

TECHNICAL FIELD

The present invention relates to a technology for neutron detection, and particularly to a sensitive film for neutron detection and a method for forming the same.

BACKGROUND

Typical radionuclides used for neutron detection are $^3$He (helium-3), $^6$Li (lithium-6), $^{10}$B (boron-10), $^{155,157}$Gd (Gadolinium-155,157), and etc. Among them, $^3$He has the best comprehensive performance, but it is seriously under-supplied and expensive, and a substitute for $^3$He is accordingly being explored in the world. In summary, $^{10}$B is a better choice at present. As neutron sensitive material, however, $^{10}$B, $^{10}$B compounds or mixtures containing $^{10}$B in solid must be adhered to the surface of the detector structure in a thin film in order to effectively play a role of the neutron detection, especially when they are applied to the common proportional gas detectors for neutron detection. When solid $^{10}$B, $^{10}$B compounds or mixtures containing $^{10}$B as neutron sensitive materials are used in common proportional gas detectors for neutron detection, the sensitive film need to satisfy with the following requirements: the film is uniform; the thickness is appropriate (generally about 1-5 microns); and the amount of other isotopes, other elements or compounds is as low as possible.

There are many methods to form sensitive films on surfaces of neutron detectors, such as chemical vapor deposition, physical vapor deposition (including magnetron sputtering and electron beam evaporation), electrostatic spraying, thermal diffusion, and the latest atomic film deposition. Chemical vapor deposition, which involves large amounts of chemical pollution, safety protection and waste disposal, is rarely used. WO2014120295A2 discloses a sensitive film formed by magnetron sputtering in which a thinner and more compact film is formed; but the sputtering equipment is expensive, the target material is much more lost, and the sputtering time is long. CN101314842A discloses a sensitive film formed by electron beam evaporation, such film has a similar advantages or disadvantages to the film formed by magnetron sputtering. US2013062531A1 discloses a sensitive film formed by electrostatic spraying in which the film is formed very quickly; but there are some potential problems such as large air gap of sensitive film, and poor control of total amount and uniformity. CN102967875A discloses a sensitive film formed by thermal diffusion which is smooth and steady in forming the film; but the overall efficiency is often low because the neutron-sensitive elements are fused and embedded in the detector wall material which brings about an increase in the proportion of ineffective components. CN103160799A discloses a sensitive film formed by atomic film deposition in which a film with the highest uniformity and compactness is formed; however a variety of gas components is required to participate in the reaction, and the formation of a large-scale film is slower and more expensive.

SUMMARY

Provided herein is a sensitive film for neutron detection and a method for forming the same, by which a film with uniform and stable thickness, excellent compactness and low cost is realized.

In one aspect, the present invention provides a method for forming a sensitive film for neutron detection, wherein the sensitive film is formed by electrophoresis coating, the liquid used for electrophoresis coating includes neutron sensitive material, electrophoresis paint and deionized water, and the neutron sensitive material is $^{10}$B single substance, $^{10}$B compound or a mixture containing $^{10}$B.

According to one embodiment of the invention, further comprising a grinding step prior to the electrophoresis coating, and the grinding step comprises pressing a coarse powder containing boron into grinding balls by sintering at high temperature, and grinding the sensitive material into particles of 0.1 to 5 microns by use of the grinding balls.

According to another embodiment of the invention, further comprising a grinding step by use of standard steel balls as grinding ball prior to the electrophoresis coating, wherein the sensitive material is ground into particles of 0.1 to 5 microns, and then the iron composition is removed from the ground sensitive material.

According to another embodiment of the invention, wherein removing iron composition is carried out by acid-washing, ferromagnetic iron, or both of them.

According to another embodiment of the invention, the boron compound is $^{10}$B$_4$C or $^{10}$B$_2$O$_3$.

According to another embodiment of the invention, the electrophoresis paint is an anodic electrophoresis paint or a cathodic electrophoresis paint.

According to another embodiment of the invention, the anodic electrophoresis paint is at least one selected from the group consisting of polybutadiene anodic electrophoresis paint and acrylic anodic electrophoresis paint, and the cathodic electrophoresis paint is at least one of epoxy cathodic electrophoresis paint, acrylate cathodic electrophoresis paint and polyurethane cathodic electrophoresis paint.

According to another embodiment of the invention, further comprising removing the organic components in the sensitive film by heating, after the sensitive film is formed by electrophoresis coating.

According to another embodiment of the invention, the heating is carried out in an inert or reducing gas atmosphere.

In another aspect, the present invention provides a sensitive film for neutron detection formed by the method described above.

According to one embodiment of the invention, the thickness of the sensitive film is 1 to 5 microns.

Compared with the prior art, the method for electrophoresis coating the sensitive film for neutron detection has the advantages of (1) high film-forming speed, which is reflected in that the neutron sensitive film of 1 m$^2$ can be coated in a few minutes, and the yield can exceed current methods at the same manual workload because detector can also be rolled into tubular or other shapes; (2) the uniform and stable film thickness, and excellent consistency and repeatability, which is very significant for neutron detectors to obtain better detection efficiency and keep the uniformity of detection efficiency; and (3) saving raw materials, which is reflected in that the utilization ratio of electrophoresis to raw powder can reach 85%, and the comprehensive cost is low.

Furthermore, because excess organic components in the sensitive film are removed by the step of heating after the sensitive film is formed, the detection efficiency of the sensitive film is improved and toxic gases are avoided at work.

Furthermore, the adhesion of the sensitive film to the substrate is improved, because the sensitive material for forming the sensitive film is micron-sized particles, which can be firmly adsorbed on the surface of the metal substrate (for example, stainless steel, aluminum, copper, and etc.).

BRIEF DESCRIPTION OF THE DRAWINGS

These and other features and advantages of the invention would become obvious from the following detailed description with reference to drawings.

Figure 1:
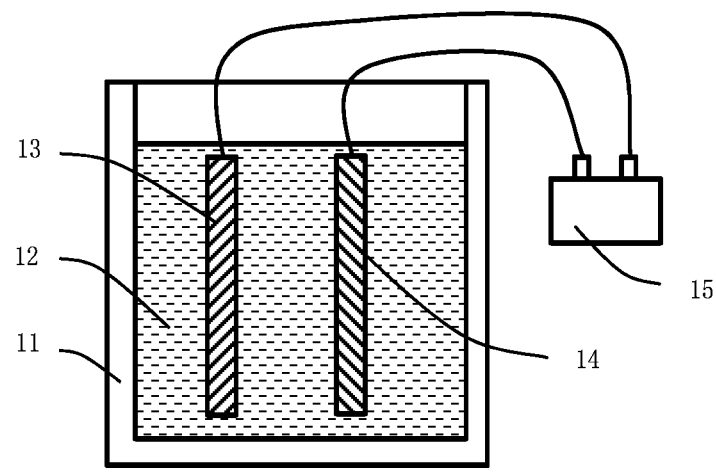
FIG. 1 is a schematic diagram of film by electrophoresiscoating on the substrate of a flat detector.

wherein the reference signs are described as follows:
11 electrophoretic tank
12 liquid used for electrophoresis coating
13 flat electrode
14 flat detector substrate
15 power supply
21 electrophoretic tank
22 liquid used for electrophoresis coating
23 columnar electrode
24 tubular detector substrate
25 power supply
31 closed heating apparatus
32 inlet
33 tubular detector substrate with square cross section
34 tubular detector substrate with circular cross section
35 flat detector substrate attached with neutron sensitive film on both sides
36 outlet
37 gas filter

DETAILED DESCRIPTION

The present invention is described in detail below in conjunction with specific embodiments.

Exemplary embodiments combining one or more aspects of the invention are described and shown in the drawing. The examples are not intended to limit the invention. One or more aspects of the invention are available in other embodiments and even in other types of devices. In addition, certain terms are used herein solely for convenience of use and are not considered to be limitations of the invention.

The method for forming a sensitive film for neutron detection by electrophoresis coating in the embodiment of the present disclosure, includes the following steps:

Step 1a: preparing a liquid used for electrophoresis coating, which includes neutron sensitive material powder, electrophoresis paint solution and water;

Step 1b: mixing and stirring the three materials in a certain proportion in a container;

Step 1c: preparing a workpiece to be coated (i.e. the detector surface substrate for attaching the sensitive film) and the necessary tooling;

Step 1d: preparing an electrophoresis tank, a power supply, positive and negative connection lines, special conductive electrodes and other necessary components for electrophoresis;

Step 1e: pouring the mixture prepared at Step 1a into the electrophoretic tank, connect the positive (or negative) connection line to the coated workpiece and connect the negative (or positive) connection line to the conductive electrode;

Step 1f: after the power supply is set with an appropriate voltage and power-on time, turning on the power supply to form the sensitive film on the workpiece;

Step 1g: taking the workpiece out and drying.

Neutron sensitive materials may be $^{10}B$ single substance, $^{10}B$ compounds or mixtures containing $^{10}B$. $^{10}B$ compound may be $^{10}B_4C$, $^{10}B_2O_3$, and etc.

The electrophoresis paint may be an anodic electrophoresis paint such as polybutadiene cationic paint, anodic acrylic acid, and etc., or a cathodic electrophoresis paint such as epoxy electrophoresis paint, acrylate electrophoresis paint, polyamine ester electrophoresis paint, and etc.

The lower the ion content of water, the better, so deionized water is generally chosen.

The Neutron sensitive material powder, the electrophoresis paint and water should be kept in suitable proportion and should be stirred evenly according to the character of electrophoresis process.

The workpiece to be coated, is the detector surface substrate for attaching the sensitive film. The workpiece to be coated is a conductor and a sensitive film will attach to its upper or lower surface. Prior to the coating, the step of surface treatment may also be included to remove dirt, grease, and etc. from the surface to be coated to increase adhesion of the film and the workpiece.

Figure 2:
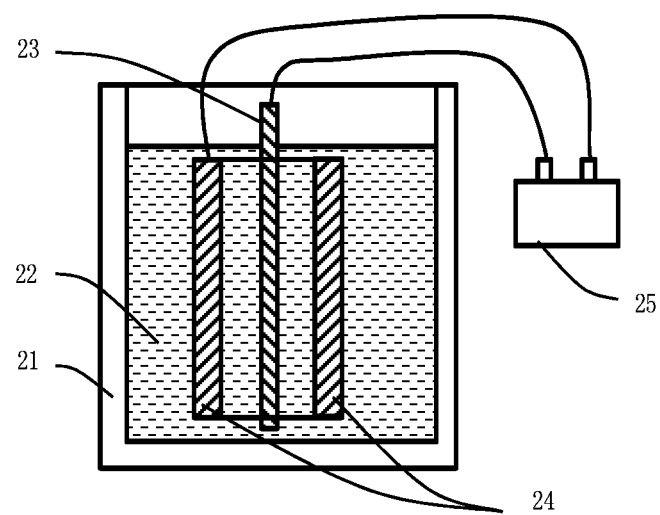
FIG. 2 is a schematic diagram of film by electrophoresiscoating on the substrate of a tubular detector.

The neutron detector may be flat, tubular, and etc., depending on the design requirements. The suitable conductive electrode is selected according to the shape of the detector substrate. For example, the detector substrate is flat and the conductive electrode is correspondingly flat. Referring to FIG. 1, a flat electrode 13 and a flat detector substrate 14 are arranged in parallel in a electrophoretic tank 11, the structures of which are approximately the same, the substrate portion to be formed the film is immersed in the liquid used for electrophoresis coating 12, and a flat-plate electric field electrophoresis arrangement is formed between the flat electrode 13 and the flat detector substrate 14. An external power supply 15 is respectively connected with the flat electrode 13 and the flat detector substrate 14. The workpiece to be coated can also be tubular, the cross-section of which can be circular, square, pentagram, hexagon, oval and other closed geometry, and the sensitive film will be attached to its inner or outer wall. As shown in FIG. 2, a detector substrate 24 is tubular and an electrode 23 can correspondingly be columnar, the columnar electrode 23 may be arranged in the center of the tubular detector substrate 24, and the substrate portion to be formed the film is all immersed in a liquid used for electrophoresis coating 22 of a electrophoretic tank 21. An external power supply 25 is respectively connected with the columnar electrode 23 and the tubular detector substrate 24.

In order to place the workpiece to be coated firmly in the electrophoretic tank, a suitable supporting tool can be designed to allow the electrophoresis process to be successfully completed.

The parameters such as the size of the electrophoretic tank, the power of the power supply, the voltage of the power supply and the power-on time shall be calculated or determined according to the shape, size and film thickness of the workpiece to be coated.

The special conductive electrode works as an electrode with the opposite polarity to the workpiece to be coated, that is, when the coated workpiece is positive electrode, the special conductive electrode is negative electrode, or when the workpiece to be coated is negative electrode, the special electrode is positive electrode. The suitable size and shape of conductive electrode is beneficial to the stablility of the film-forming process and the uniformity of the film.

The electrophoresis paint may be either an anodic electrophoresis paint or a cathodic electrophoresis paint. Depending on the type of the electrophoresis paint, the workpiece to be coated and the electrode are respectively connected to the positive and negative electrodes of the power supply. If the electrophoresis paint is an anodic electrophoresis paint, the workpiece to be coated is connected to the positive electrode and the electrode to the negative electrode and vice versa.

The workpiece undergoes four successive chemical and physical processes in the electrophoretic tank: electrophoresis, electrolysis, electrodeposition and electroosmosis.

In accordance with standard electrophoresis procedures, the coated workpiece needs to be dried to a certain temperature, for example 120° C., to remove moisture and cure by cross-linking, which is not necessary or may be excluded.

On the other hand, after the film is formed on the workpiece by electrophoresis, neutron sensitive materials are attached to the film, but there are still a lot of polymer organic compounds in the film, which is products of the electrophoresis paint after electrophoresis. With the same amounts of neutron sensitive materials, the film containing organic components has lower detection efficiency, higher resistance value than the pure neutron sensitive film. As result, it is difficult to collect the charges and the toxic gas is slowly released form organic compounds. Therefore, after forming the sensitive film by the above steps, the detector surface substrate is heated at a high temperature to remove the organic components, and the heating process includes the following steps:

Step 2a: preparing a heating apparatus with suitable form, volume and power;

Step 2b: preparing a suitable exhaust gas recovery apparatus;

Step 2c: filling into an inert gas or a reducing gas in advance to prevent the sensitive film from being oxidized, if necessary;

Step 2d: placing the detector surface substrate attached with the neutron sensitive film into the heating device for heating;

Step 2e: cooling and taking out the detector substrate.

Figure 3:
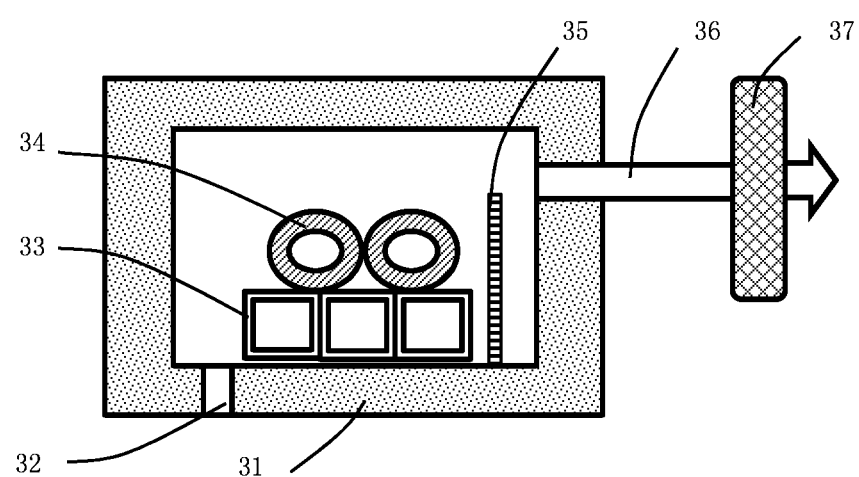
FIG. 3 is a schematic diagram of heating of the detector substrate containing neutron sensitive films and collection, filtration and emission of organic gases.

FIG. 3 is a schematic diagram of heating of the detector substrate containing neutron sensitive films and collection, filtration and emission of organic gases. As shown in FIG. 3, a tubular detector substrate (with a square section) 33 with a neutron sensitive film attached to the inner wall, a tubular detector substrate (with a circular section) 34 with a neutron sensitive film attached to the inner wall, and a flat detector substrate 35 with neutron sensitive films attached to both sides are placed in a closed heating apparatus 31. The inert gas or the reducing gas is filled into heating apparatus 31 through an inlet 32, and the substrates attached with neutron sensitive films are heated under the protective atmosphere to remove organic compounds from neutron sensitive films and discharge the released gas through an outlet 36. A gas filter 37 may be arranged at the outlet 36 to filter the toxic materials in the discharged gas. Wherein the tubular detector substrate (with a square section) 33 with the neutron sensitive film attached to the inner wall, the tubular detector substrate (with a circular section) 34 with the neutron sensitive film attached to the inner wall, and the flat detector substrate 35 with neutron sensitive films attached to both sides in FIG. 3 are exemplary, one skilled in the art should understand that any shape and number of the attached neutron sensitive film of the tubular detector can be placed in the heating apparatus 31.

The heating apparatus may be a variety of resistance or induction furnaces that can raise the temperature of the object and not limited to the heating apparatus 31 shown in FIG. 3.

The capacity and power of the heating apparatus shall be sufficient to accommodate the detector substrate involved and meet its need for uniform heating.

When heating, the temperature was controlled to be up slowly at a rate of 1~10° C./min, so that the sensitive film on the surface of the detector substrate are not warped or peeled due to temperature differences and the materials of the heating apparatus do not react with hot gases.

At the high temperature, the organic compounds evaporate and decompose, but some of the heat-resistant organic compounds may be oxidized to become solid materials. Therefore, the introduction of inert or reducing gases prevents oxidation of heat-resistant organic compounds and increases their volatilization rate, but this process is not essential.

The optimum heating temperature is determined by the composition of organic compounds in the electrophoresis paint, and the $^{10}B$ is not oxidized to produce $^{10}B_2O_3$ so as to decrease the content of the $^{10}B$. After heating, it is best that the content of $^{10}B$ in the film reaches a maximum.

The heating apparatus may be internally sealed or may be placed in a sealed container with a pipe to discharge toxic gases, because the gaseous volatiles produced by heating may contain toxic ingredients.

The gaseous volatiles produced by heating should be harmless treatment. For example, gaseous volatiles produced by heating are guided through a pipe to pass through active carbon or various filters for filtering toxic and harmful gases, and then resulted gases are discharged when they meet the emission requirements.

The organic film containing neutron sensitive materials can be closely attached to the surface of the detector, because the organic molecules deposit on the metal surface and closely contact with the metal surface to form a very strong van der Waals force when the organic molecules are by driven the electric field force. When heated at high temperatures, solid organic molecules in the film are vaporized and discharged and only neutron sensitive particles (for example, $^{10}B$ or $^{10}B_4C$) and a small amount of carbon particles remain in the film. In this case, the contact surface between particles decreases, so the van der Waals force decrease and larger particles are more likely to fall off.

In order to improve the bonding between the neutron film and the substrate, the van der Waals force can be increased by reducing the size of sensitive particles. According to the simulation result of atomic physics theory, the thickness of the whole boron film is better at 1-5 microns, so the particle size is better less than 5 microns. Theory and practice show that micron particles can be firmly adsorbed on the surface of metal (e.g. stainless steel, aluminum, copper, and etc.). In general, the particle size of boron powder or boron carbide powder should be in the range of 1 micron as possible.

However, the commercially available boron powder has a particle size of more than several tens of microns due to process limitations, so that the method may also contain the step of grinding neutron sensitive material particles to micron-sized particles before electrophoresis.

The grinding step may be performed in two ways:

One way is, pressing the boron-containing coarse powder, which is particle with a particle size of more than 10 microns and containing $^{10}$B or $^{10}$B compounds, into grinding balls by sintering at high temperature, and then grinding boron powder by the grinding balls. The type and amount of other impurities in the boron powder obtained in this way are very few.

The other way is, grinding the sensitive material with standard steel balls, which introduce iron components, and then removing iron composition from the ground sensitive material by acid-washing iron removal or ferromagnetic iron removal. The acid-washing process can be, dissolving iron with organic or inorganic acids, which do not react with boron and boron compounds, and then successively filtering, washing, ultrasonic flushing. The ferromagnetic iron removal process can be, removing iron from the powder by the magnetic of ferromagnetic materials.

EXAMPLE 1

First, $^{10}$B$_4$C (boron carbide-10) powder was used as a suitable neutron-sensitive material, and the abundance of $^{10}$B was 92% in the powder.

Boron carbide powder was ground with a ball mill, stainless steel balls were used as grinding balls, and iron was removed by acid-washing and filtration processes.

Then, the boron carbide powder was coated on the surface of the detector substrate by electrophoresis.

Referring to FIG. 2, the electrode was a columnar electrode, boron carbide was coated on the inner wall of the stainless steel tube, and cathodic electrophoresis paint was used as the electrophoresis paint, which was acrylate, in this example.

Boron carbide powder, acrylate and deionized water were stirred evenly, and then added to the electrophoretic tank 21.

A tubular detector substrate 24 was placed in the tank 21, an electrode 23 was embedded in the tubular detector substrate 24, and the negative and positive electrodes of the power supply 25 connected the substrate 24 and the electrode 23 with a connecting wire, respectively. Stainless steel tube was used as the tubular detector substrate 24 in this example.

The voltage of the power supply was set to 15V, and the power-on was set time to 20 s.

The power supply was turned on to carry out the electrophoresis.

The tubular detector substrate 24 attached with a film was taken out of the tank 11, drained and placed into the heating apparatus 31 as shown in FIG. 3.

The heating apparatus 31 was set at a target temperature, the temperature rised slowly at a rate of 1° C./min and maintained at a constant temperature for 20 minutes.

During heating, the organic gases discharged from the heating apparatus 31 was guided through the outlet 36 and corresponding pipes into a gas filter 37 containing a large amount of activated carbon, and gases from the gas filter 37 were discharged when they met the emission requirements.

After heating, the tubular detector substrate 24 attached with a film were cooled at ambient temperature.

Compared with methods to form sensitive films on surfaces of neutron detectors, such as chemical vapor deposition, physical vapor deposition (including magnetron sputtering and electron beam evaporation), electrostatic spraying, thermal diffusion, and the latest atomic film deposition in the prior art, the method for electrophoresis the sensitive film for neutron detection, has the advantages of high film-forming speed, which is reflected in that the neutron sensitive film of 1 m$^2$ can be coated in a few minutes, and the yield can exceed current methods at the same manual workload because detector can also be rolled into tubular or other shapes; saving raw materials, which is reflected in that the utilization ratio of electrophoresis to raw powder can reach 75%, and the comprehensive cost is low; and the uniform and stable film thickness, and excellent consistency and repeatability, which is very significant for neutron detectors to obtain better detection efficiency and keep the uniformity of detection efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for forming a sensitive film for neutron detection, wherein the sensitive film is formed by electrophoresis coating, a liquid used for electrophoresis coating includes neutron sensitive material, electrophoresis paint and deionized water, and the neutron sensitive material is $^{10}$B single substance, $^{10}$B compound or mixture containing $^{10}$B, and wherein the neutron sensitive material is ground in a grinding step prior to the electrophoresis coating, wherein the grinding step comprises pressing a coarse powder containing boron into grinding balls by sintering at high temperature, and grinding the neutron sensitive material into particles of 0.1 to 5 microns by use of the grinding balls.

2. The method according to claim 1, wherein the boron compound is $^{10}$B$_4$C or $^{10}$B$_2$O$_3$.

3. The method according to claim 1, wherein the electrophoresis paint is an anodic electrophoresis paint or a cathodic electrophoresis paint.

4. The method according to claim 3, wherein the anodic electrophoresis paint is at least one selected from the group consisting of polybutadiene anodic electrophoresis paint and acrylic anodic electrophoresis paint; and the cathodic electrophoresis paint is at least one of epoxy cathodic electrophoresis paint, acrylate cathodic electrophoresis paint and polyurethane cathodic electrophoresis paint.

5. The method according to claim 1, further comprising removing organic components in the neutron sensitive film by heating after the neutron sensitive film is formed by electrophoresis.

6. The method according to claim 5, wherein the heating is carried out in an inert or reducing gas atmosphere.

7. A sensitive film for neutron detection, being formed by the method according to claim 1.

8. The sensitive film for neutron detection according to claim 7, wherein the thickness of the sensitive film is 1 to 5 microns.

9. A method for forming a sensitive film for neutron detection, wherein the sensitive film is formed by electrophoresis coating, a liquid used for electrophoresis coating includes neutron sensitive material, electrophoresis paint and deionized water, and the neutron sensitive material is $^{10}$B single substance, $^{10}$B compound or mixture containing $^{10}$B, and wherein the neutron sensitive material is ground in a grinding step prior to the electrophoresis coating, wherein the grinding step comprises grinding the neutron sensitive material into particles of 0.1 to 5 microns by use of standard steel balls as grinding balls, and removing an iron composition from the ground neutron sensitive material.

10. The method according to claim 9, wherein the removing of the iron composition is carried out by acid-washing, ferromagnetic iron, or both of them.

11. The method according to claim 9, wherein the boron compound is $^{10}B_4C$ or $^{10}B_2O_3$.

12. The method according to claim 9, wherein the electrophoresis paint is an anodic electrophoresis paint or a cathodic electrophoresis paint.

13. The method according to claim 12, wherein the anodic electrophoresis paint is at least one selected from the group consisting of polybutadiene anodic electrophoresis paint and acrylic anodic electrophoresis paint; and the cathodic electrophoresis paint is at least one of epoxy cathodic electrophoresis paint, acrylate cathodic electrophoresis paint and polyurethane cathodic electrophoresis paint.

14. The method according to claim 9, further comprising removing organic components in the sensitive film by heating after the sensitive film is formed by electrophoresis.

15. The method according to claim 14, wherein the heating is carried out in an inert or reducing gas atmosphere.

* * * * *